Aug. 1, 1933.     C. FÖHL     1,920,689
POWER PLANT
Filed June 21, 1928     2 Sheets-Sheet 1

INVENTOR
Carl Föhl
BY
his ATTORNEY

Aug. 1, 1933.     C. FÖHL     1,920,689
POWER PLANT
Filed June 21, 1928     2 Sheets-Sheet 2

INVENTOR
Carl Föhl
BY
his ATTORNEY

Patented Aug. 1, 1933

1,920,689

UNITED STATES PATENT OFFICE 1,920,689

POWER PLANT

Carl Föhl, Stockholm, Sweden, assignor to Ruths-accumulator Aktiebolag, Berlin, Germany, a Corporation of Sweden Application June 21, 1928, Serial No. 287,243, and in Germany June 28, 1927

16 Claims. (Cl. 290—4)

The present invention relates to power plants provided with accumulators and with a plurality of power devices operating on a common electrical net or transmission line having widely fluctuating power requirements, such as, for example, power plants for municipalities.

In such cases the current generation has been distributed between the individual power sources by subdividing the total load and suitably regulating the supply of steam to the individual engines or plants, particularly those carrying the base load. The boilers furnishing this steam then had to be correspondingly regulated.

This mode of control is ineffective because the efficiency of the boiler plants can not be changed as rapidly as desired. Boiler firing must therefore be increased before the peak is reached, or other boilers must be fired, which usually requires about an hour's time. If steam pressure in these boilers reaches the operating pressure before the expected peak steam consumption arrives, the fires must be reduced if the safety valves of the boilers are not to blow. A characteristic feature of present methods of distributing or subdividing the load is the burden imposed on the individual power sources (machines, engines or plants), and the consequent necessity for close regulation of firing of the boilers, lack of attention by the personnel easily causing serious difficulties to arise.

These disadvantages are particularly pronounced in modern plants where the boilers operate under high pressures and temperatures and have very small water chambers which are extremely sensitive to changes of load.

The present invention relates to a method of power distribution and regulation for power plants of this type in which defects such as mentioned above are avoided.

This desirable object is accomplished by adapting the power supplied by the base load engines or plants to the prevailing steam generation, and by providing steam for the power sources covering the peak loads wholly or partially from one or more heat accumulators, the steam supply to these peak load power sources being governed by that part of the total load not covered by the base load engines, through suitable speed regulators or governors. The distribution of the power load thus depends on the steam generation, while heretofore, the steam generation depended on the distribution or load subdivision. It follows, therefore, that the steam supply to the power sources covering the base load may be regulated according to boiler pressure or steam temperature or any other equivalent variable, either automatically or manually, while the part of the total load not covered by the base load power is distributed, preferably by means of governors, to the peak load power sources. The load, and therefore the efficiency, of the engines is thus automatically adapted to the prevailing steam generation.

It is, of course, preferable in all cases to provide limit regulators which limit the speed of the engine, when the steam supplied to the engine corresponds to a load greater than the momentary net consumption.

If an equalized pressure (or constant pressure) accumulator be included in the base load plant, this accumulator is charged whenever the load production of the base load engine is limited by the governor, or whenever the steam generation of the boiler exceeds the consumption capacity of the engines in operation. The supply of steam to the accumulator, or the supply of cold water to condense the steam is therefore regulated by boiler pressure or the like, to produce this result. If the load is distributed in the base load plants or engines by overflow valves, the governors actuated by boiler pressure are so adjusted that steam will be accumulated whenever the boiler pressure rises, after the overflow valves positioned in front of the engines have been completely opened.

If a plurality of turbines are used in the several power plants, they can be placed in parallel or a definite load can be provided for the individual turbines by adjusting regulators to different speeds. For example, the engines may be placed in and out of operation so as to operate at their best efficiencies. One or more of the turbines may be shut off during light load and the overflow regulators then will distribute the load to the engines remaining in operation without special adjustment.

Further features of the invention will be apparent from the following description, and from the accompanying drawings, wherein.

The boiler plant $K_1$ of the base load plant receives cold feed water through valve W, in response to changes in water level, from the condensate reservoir C, or hot feed water through valve H, controlled by the live steam pressure in steam pipe $F_1$, from feed water accumulator $S_1$, which is in communication with steam pipe $F_1$. Water is supplied to accumulator $S_1$ by pump $P_1$ from the condensate reservoir C and is controlled by valve R actuated in response to variations of boiler pressure.

Connected to steam pipe $F_1$ is an overflow valve $V_1$ regulated or controlled by the boiler pressure and a speed controlled valve $Z_1$, controlling flow of steam to the turbine or base load prime mover $T_1$ which drives the generator $G_1$, the condensate from the turbine passing to the reservoir C.

The steam generated in the boiler plant $K_2$ of the peak load plant flows through the live steam passage $F_2$ either to the turbine $T_2$, which may be considered a first peak load prime mover, regulated by the governor controlled valve $Z_2$, this turbine driving the generator $G_2$, or it is passed through an overflow valve $V_2$ controlled by the steam pressure in pipe $F_2$ to the accumulator $S_2$, which furnishes steam to turbine $T_s$, which may be considered a second peak load prime mover, through governor controlled valve $Z_s$, the turbine $T_s$ driving generator $G_s$. Generators $G_s$, $G_1$ and $G_2$ are electrically connected with net or transmission line N, and hence are connected for synchronous operation.

Figure 1:
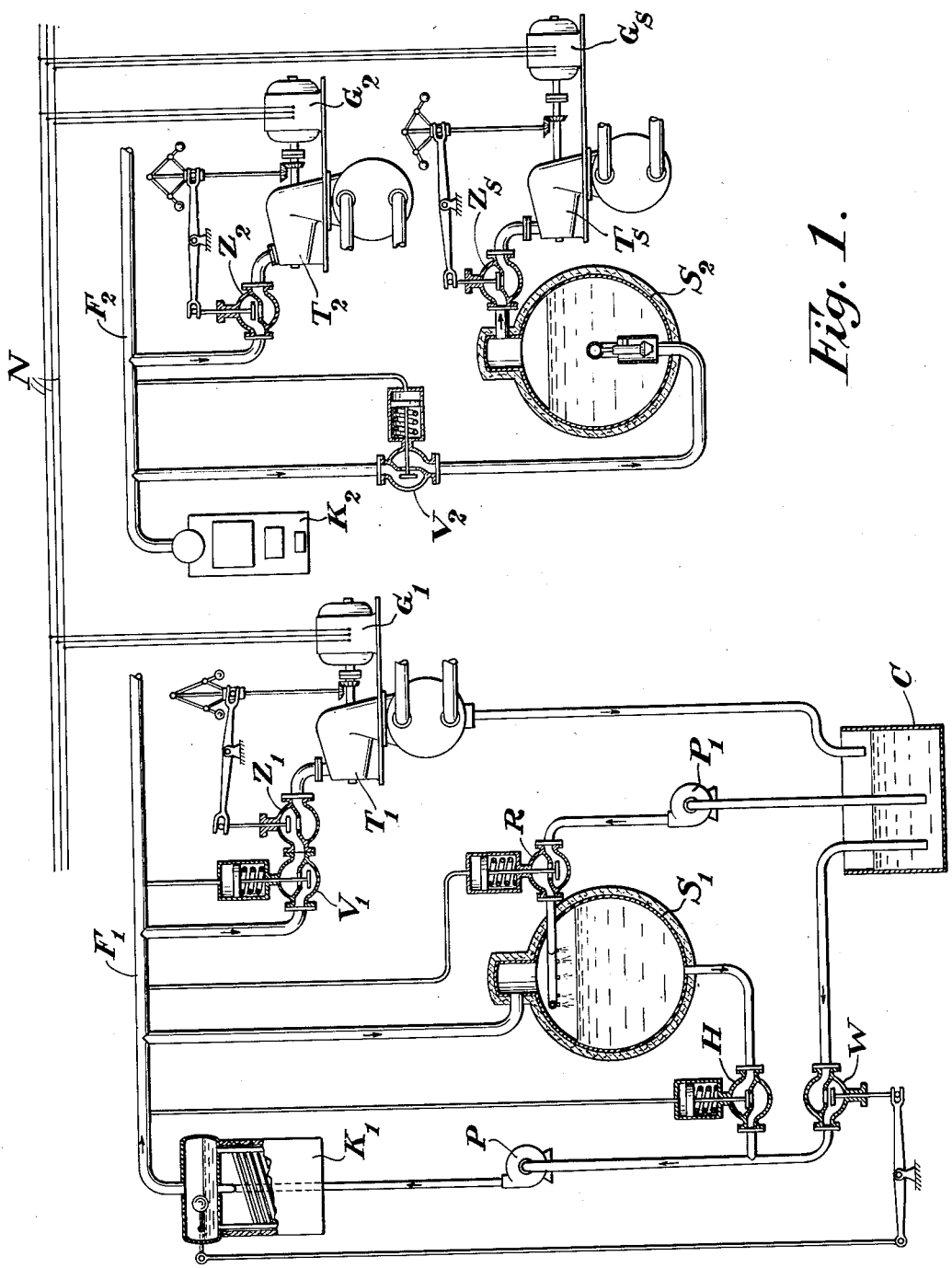
Fig. 1 shows a power plant comprising a base load plant and a peak load plant operating on a common net or transmission line.
Figures 2, 3:
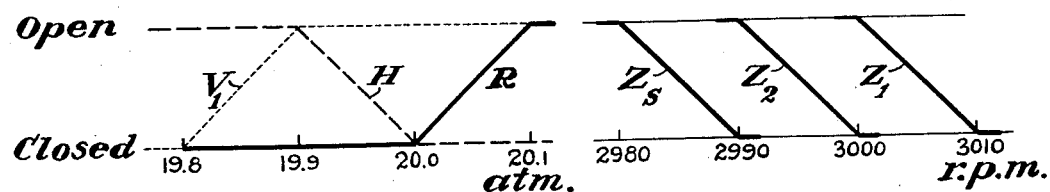
Figs. 2 and 3 are diagrams showing the successive operation of the regulating devices.

Fig. 2 shows that as the steam pressure of boiler plant $K_1$ increases, $V_1$ opens, then H closes, and finally R opens. Fig. 3 shows that governor controlled valve $Z_s$, $Z_2$, $Z_1$ close successively with increase in turbine speed.

Figure 4:
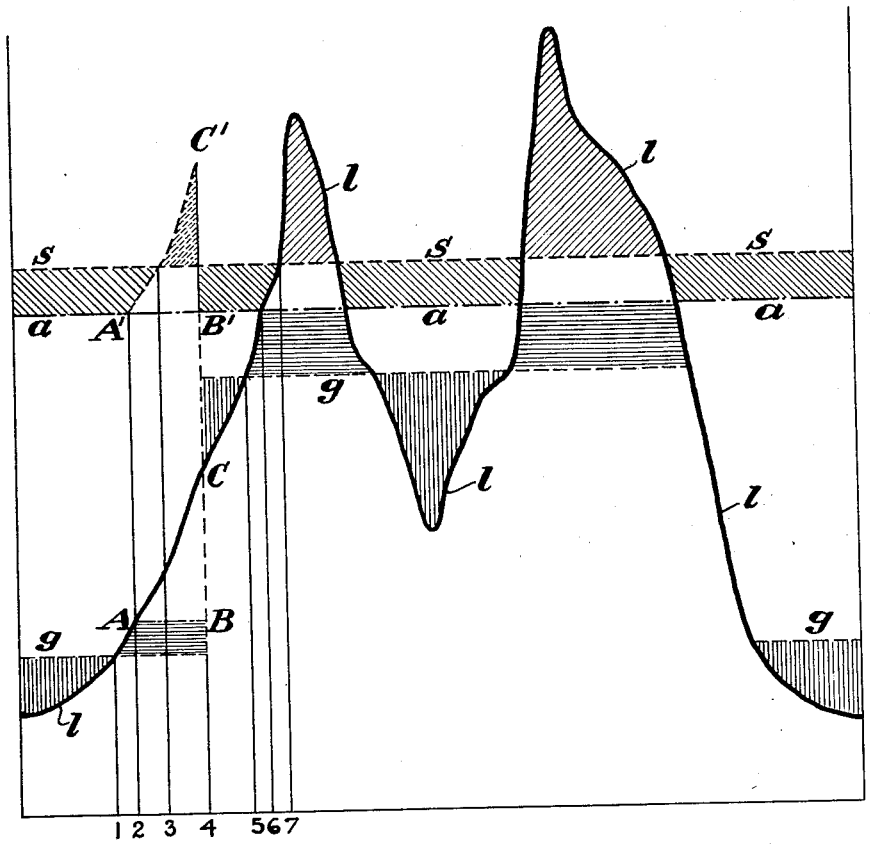
Fig. 4 shows a typical load diagram for a plant regulated as described.

Considering Fig. 4, the line 1 shows the load curve in kg. of steam per hour. The straight line $a$ is the limit of the load to be carried by the base load plant. The peaks above this limit are carried by the peak plant. The steam generation of the base load plant proceeds along the line $g$, while in the peak plant the boilers are fired to correspond with straight line $s$. The vertically hatched surfaces show the loads (or charges) of the constant pressure accumulator $S_1$, while the horizontal hatched surfaces show discharges. Similarly, the right and left hatched surfaces show the charging and discharging of the accumulator $S_2$.

During the first period the load is carried solely by the base load plant, the governor controlled valve $Z_1$ limiting the steam supply. The excess steam generated increases the pressure in pipe $F_1$, thus opening valve R, and is accumulated in $S_1$, valve H being closed at this time, so that the boiler receives cold feed water. When the required steam, due to increase of load, exceeds the quantity passed by valve $V_1$, the boiler pressure drops slightly and valve R is closed, thus stopping condensation of steam. Valve H is then opened, feeding boiler $K_1$ with hot water, and the steam generation is therefore increased from line $g$ to line A—B.

During the second period the steam supply necessary to carry the load exceeds the steam generation. The speed of generator $G_1$ therefore decreases and the frequency of current generated is correspondingly reduced, and the peak load power plant begins to function, the steam previously generated in boiler plant $K_2$ having flowed at high boiler pressure through the open valve $V_2$ to accumulator $S_2$. The decreasing speed of rotation of the governor controlling valve $Z_2$, resulting from the reduced frequency of the current in the line N to which generator $G_2$ is connected, first opens the steam supply to turbine $T_2$, so that the latter can assume part of the load, while the simultaneously decreasing boiler pressure closes valve $V_2$. In Fig. 4 the triangle A—B—C of the load curve covered by the peak plant is again shown above the straight lines $a$ as a triangle A'—B'—C', to more clearly show the peak plant operation.

During the third period, the steam demand also exceeds the quantity of steam generated in the peak plant, so that on further decrease of speed of rotation, pressure controlled valve $Z_s$ also opens, and passes steam from accumulator $S_2$ for driving the turbine $T_s$.

During the fourth period the base load plant takes over a large part of the increased load. For this purpose, the firing in the base load plant is increased for a certain initial period of time, so that during this fourth period there is a great increase in steam generation in boiler plant $K_1$, causing the pressure in steam pipe $F_1$ to rise until turbine $T_1$ is supplied by further opening of valve $V_1$, the result being that as the speed of the turbine increases, valve $Z_s$ is closed and valve $V_2$ opens to continue charging the accumulator $S_2$.

At the same time the hot feed water supply to boiler $K_1$ in the base load plant is interrupted on further increase in boiler pressure, by the closing of valve H, and valve R opens to condense the excess steam in accumulator $S_1$, thus returning the entire plant to the same state of operation as existed in the first period. Steps five, six, seven, etc., repeat the cycle described above, since these steps correspond to the successive operating variations shown by steps one, two, three and four.

It will be understood that the drawings are for illustrative purposes and that the invention may be embodied in a wide variety of structures and arrangements.

I claim:

1. The method of operating a power installation having a plurality of power plants on a common load net, comprising using a base load power plant for carrying a base load, using a peak load power plant for carrying a peak load, utilizing excess steam generated in said base plant for increasing steam generation in said base plant, and utilizing excess steam generated in said peak plant for increasing the power output of said peak plant.

2. In a power installation, a base power plant comprising a steam generator and an engine unit for carrying a base load, a peak power plant comprising a steam generator and an engine for carrying a peak load, means controlling the load carried by said base unit in accordance with the variations of pressure of steam generated in said base steam generator, means for storing steam generated in said peak steam generator, and speed responsive means for supplying said stored steam to said peak engine.

3. In a power plant installation having a plurality of power plants on a common load net, a base power plant, a peak power plant, means for storing excess steam in said base plant to assist steam generation, and means for storing excess steam in said peak plant to supply excess steam demand.

4. The method of producing electric energy to meet a rising demand by means of base and peak load plants having steam driven turbo-electric units interconnected to run synchronously which comprises generating a surplus of steam in the base load plant, carrying the full load with the base load plant, storing the surplus steam generated while generating and storing steam in the peak load plant, adding peak load plant energy when the load has risen to correspond with the energy supply of the base load plant to take care of the difference between demand and the supply of the base load plant, and, while the peak load plant is so operating, increasing the rate of steam production in the base load plant so that the base load plant again takes care of the full load.

5. The method of producing electric energy to meet a rising demand by means of base and peak load plants having steam driven turbo-electric units interconnected to run synchronously which comprises generating a surplus of steam in the base load plant, carrying the full load with the base load plant, storing the surplus steam generated while generating and storing steam in the peak load plant, adding peak load plant energy when the load has risen to correspond with the energy supply of the base load plant to take care of the difference between demand and the supply of the base load plant, and, while the peak load plant is so operating, increasing the rate of steam production in the base load plant to an amount corresponding to more than the total demand for energy and again carrying the full load with the base load plant and storing surplus steam.

6. The method of producing electric energy to meet a rising demand by means of base and peak load plants having steam driven turbo-electric units interconnected to run synchronously which comprises generating a surplus of steam in the base load plant, carrying the full load with the base load plant, heating water with the surplus steam generated to produce hot water, utilizing the hot water to produce steam as the load increases, generating and storing steam in the peak load plant while the base load plant is carrying the full load, adding peak load energy when the load has risen to correspond with the energy supply of the base load plant to take care of the difference between demand and the supply of the base load plant, and, while the peak load plant is so operating, increasing the rate of steam production in the base load plant to an amount corresponding to more than the total demand for energy and again carrying the full load with the base load plant and storing the surplus steam.

7. A power assembly comprising a base load plant and a peak load plant, each plant including a steam generator, a prime mover, an alternating current electric generator driven by the prime mover, an accumulator, means to conduct steam from the steam generator to the prime mover and the accumulator and means in each plant whereby energy stored in the accumulator may be used in the plant, said electric generators being interconnected to run at the same speed and automatic means for controlling supply of steam to the prime movers of the different plants responsive to different ranges of speed of the prime movers.

8. A power assembly comprising a base load plant and a peak load plant, each plant including a steam generator, a prime mover, an alternating current electric generator driven by the prime mover, an accumulator, means to conduct steam from the steam generator to the prime mover and the accumulator and means in each plant whereby energy stored in the accumulator may be used in the plant, said electric generators being interconnected to run at the same speed and automatic means for controlling supply of steam to the prime movers of the different plants responsive to different ranges of speed of the prime movers, the range of speed for controlling the base load plant being higher than the range of speed for controlling the peak load plant.

9. A power assembly comprising a base load plant including a base load prime mover, a steam generator, a conduit for conducting steam from said generator to said prime mover, an overflow valve in said conduit, an alternating current electric generator driven by said prime mover, means responsive to the speed of said prime mover controlling supply of steam thereto, an accumulator, means to supply steam from said generator to said accumulator, means to supply cold water to said accumulator to condense the steam and produce hot water, means to control the supply of cold water in response to pressure of steam generated, and means to supply cold water and water from the accumulator to the steam generator, and a peak load plant comprising a first peak load prime mover, a steam generator, a conduit for conducting steam from the last mentioned steam generator to said first peak load prime mover, an accumulator, means to supply steam to said accumulator from the last mentioned steam generator, automatic means to control the supply of steam to the accumulator in accordance with variations of pressure of steam generated, a second peak load prime mover supplied with steam from said accumulator, alternating current electric generating means driven by the peak load prime movers, the electric generators of the different plants being interconnected to run synchronously, and means to control the supply of steam to the peak load prime movers, the supply means to the different prime movers being responsive to different ranges of speed.

10. A power assembly comprising a base load plant including a base load prime mover, a steam generator, a conduit for conducting steam from said generator to said prime mover, an overflow valve in said conduit, an alternating current electric generator driven by said prime mover, means responsive to the speed of said prime mover controlling supply of steam thereto, an accumulator, means to supply steam from said generator to said accumulator, means to supply cold water to said accumulator to condense the steam and produce hot water, means to control the supply of cold water in response to pressure of steam generated, and means to supply cold water and water from the accumulator to the steam generator, and a peak load plant comprising a first peak load prime mover, a steam generator, a conduit for conducting steam from the last mentioned steam generator to said first peak load prime mover, an accumulator, means to supply steam to said accumulator from the last mentioned steam generator, automatic means to control the supply of steam to the accumulator in accordance with variations of pressure of steam generated, a second peak load prime mover supplied with steam from said accumulator, alternating current electric generating means driven by the peak load prime movers, the electric generators of the different plants being interconnected to run synchronously, and means to control the supply of steam to the peak load prime movers, the supply means to the different prime movers being responsive to different ranges of speed, the range of speed for controlling the base load prime mover being the highest, the range of speed for controlling the first peak load prime mover being the next lower and the range of speed for controlling the second peak prime mover being the lowest.

11. A power assembly comprising a base load plant and a peak load plant, each plant including a prime mover, an electric generator driven by the prime mover, and means to supply energy to the prime mover, said electric generators being electrically interconnected to operate synchronously, the energy supply means of the base load plant including a steam generator, a conduit connecting said steam generator with the prime mover of the base load plant, an overflow valve in said conduit responsive to variations of pressure of steam ahead of the same, and speed responsive means controlling supply of steam to the base load prime mover for speeds above a predetermined value, and the energy supply means for the peak load plant including a heat accumulator connected to supply energy to the prime mover of the peak load plant, and speed responsive means controlling the supply of energy from the heat accumulator to the peak load prime mover.

12. A power assembly comprising a base load plant and a peak load plant, each plant including a prime mover, an electric generator driven by the prime mover, and means to supply energy to the prime mover, said electric generators being electrically interconnected to operate synchronously, the energy supply means of the base load plant including a steam generator, a conduit connecting said steam generator with the prime mover of the base load plant, an overflow valve in said conduit responsive to variations of pressure of steam and operating to increase its valve opening on increase of actuating pressure, and speed responsive means controlling supply of steam to the base load prime mover for speeds above a predetermined value, and the energy supply means for the peak load plant including a heat accumulator connected to supply energy to the prime mover of the peak load plant, and speed responsive means controlling the supply of energy from the heat accumulator to the peak load prime mover.

13. A power assembly comprising a base load plant and a peak load plant, each plant including a prime mover, an electric generator driven by the prime mover, and means to supply energy to the prime mover, said electric generators being electrically interconnected to operate synchronously, the energy supply means of the base load plant including a steam generator, a conduit connecting said steam generator with the prime mover of the base load plant, an overflow valve in said conduit responsive to variations of pressure of steam, and speed responsive means controlling supply of steam to the base load prime mover for speeds above a predetermined value, the prime mover of the peak load plant including a plurality of power units, and the energy supply means for the peak load plant including a steam generator and a heat accumulator connected to supply energy in parallel to the prime mover units of the peak load plant, and speed responsive means controlling the supply of energy from the peak load steam generator and the heat accumulator to the peak load prime mover.

14. A power assembly comprising a base load plant and a peak load plant, each plant including a prime mover, an electric generator driven by the prime mover, and means to supply energy to the prime mover, said electric generators being electrically interconnected to operate synchronously, the energy supply means of the base load plant including a steam generator, a conduit connecting said steam generator with the prime mover of the base load plant, an overflow valve in said conduit responsive to variations of pressure of steam, and speed responsive means controlling supply of steam to the base load prime mover for speeds above a predetermined value, and the energy supply means for the peak load plant including a heat accumulator connected to supply energy to the prime mover of the peak load plant, and speed responsive means controlling the supply of energy from the heat accumulator to the peak load prime mover, the last mentioned speed responsive means acting to control flow of steam in a different range of pressures from that of the first mentioned speed responsive means.

15. A power assembly comprising a base load plant and a peak load plant, each plant including a prime mover, an electric generator driven by the prime mover, and means to supply energy to the prime mover, said electric generators being electrically interconnected to operate synchronously, the energy supply means of the base load plant including a steam generator, a conduit connecting said steam generator with the prime mover of the base load plant, an overflow valve in said conduit responsive to variations of pressure of steam ahead of the same, and speed responsive means controlling supply of steam to the base load prime mover for speeds above a predetermined value, and the energy supply means for the peak load plant including a heat accumulator connected to supply energy to the prime mover of the peak load plant, and speed responsive means controlling the supply of energy from the heat accumulator to the peak load prime mover, said base load plant including a feed water accumulator.

16. The method of producing electric energy by means of base and peak load plants having steam driven turbo-electric units interconnected to run synchronously and including a feed water accumulator in the base load plant and a steam accumulator in the peak load plant which comprises carrying the entire plant load by steam generation in the base load plant when the load is small and accumulating heated feed water in the base load plant and steam in the peak load plant, utilizing accumulated feed water on increase of load to increase the capacity of the base load plant, utilizing steam generated in the peak load plant when the load exceeds the power production of the base load plant, and on still further increase of load using steam stored in the peak load plant to augment the capacity of the peak load plant.

CARL FÖHL.